US012746792B2

(12) United States Patent
Kim et al.

(10) Patent No.: US 12,746,792 B2
(45) Date of Patent: Sep. 29, 2026

(54) SUSPENSION FOR A VEHICLE

(71) Applicants: HYUNDAI MOTOR COMPANY, Seoul (KR); KIA CORPORATION, Seoul (KR)

(72) Inventors: Jong Min Kim, Seoul (KR); Byung Gu Kang, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 842 days.

(21) Appl. No.: 18/119,485

(22) Filed: Mar. 9, 2023

(65) Prior Publication Data

US 2024/0092131 A1 Mar. 21, 2024

(30) Foreign Application Priority Data

Sep. 19, 2022 (KR) ........................ 10-2022-0117889

(51) Int. Cl.

| | |
|---|---|
| ***B60G 7/00*** | (2006.01) |
| ***B62D 7/18*** | (2006.01) |
| ***F16C 11/06*** | (2006.01) |

(52) U.S. Cl.

CPC ............... *B60G 7/005* (2013.01); *B62D 7/18* (2013.01); *F16C 11/0695* (2013.01); *B60G 2204/148* (2013.01); *B60G 2204/416* (2013.01); *B60G 2204/4404* (2013.01)

(58) Field of Classification Search

CPC .... F16C 11/0695; F16C 11/0604; B60G 7/00; B60G 7/02; B60G 7/005

See application file for complete search history.

(56) References Cited

U.S. PATENT DOCUMENTS

| | | | | |
|---|---|---|---|---|
| 2,465,751 A * | 3/1949 | Robins | B60R 1/02 | 403/123 |
| 6,382,865 B1 * | 5/2002 | Paxman | F16C 11/0609 | 403/139 |
| 2005/0141955 A1 * | 6/2005 | Chang | B60D 1/52 | 403/128 |
| 2017/0008558 A1 * | 1/2017 | Krüger | F16C 11/0695 | |

FOREIGN PATENT DOCUMENTS

KR 20160121049 A 10/2016

* cited by examiner

*Primary Examiner* — Daniel J Wiley

(74) *Attorney, Agent, or Firm* — Lempia Summerfield Katz LLC

(57) ABSTRACT

A suspension for a vehicle provides a configuration in which a bolt is screw-fastened to a stud part of a ball joint in a state in which the stud part is inserted into a knuckle, an outer diameter of the stud part is increased at the time of fastening the bolt so that the stud part and the knuckle are coupled to each other. Thus, a position of a hard point corresponding to a center of the ball joint is not changed when the ball joint is coupled by the bolt.

11 Claims, 5 Drawing Sheets

SUSPENSION FOR A VEHICLE

CROSS REFERENCE TO RELATED APPLICATION

The present application claims priority to Korean Patent Application No. 10-2022-0117889, filed on Sep. 19, 2022, the entire contents of which are incorporated herein by reference.

BACKGROUND

Field

The present disclosure relates to a suspension for a vehicle.

Description of the Related Art

A suspension for a vehicle includes a suspension arm for controlling a motion of a wheel, and the types of suspension arms are classified into an L-arm having an L shape and an A-arm having an A shape depending on the shape of the suspension arm. When a pair of upper and lower suspension arms is provided, the upper arm is arranged at the upper side, and the lower arm is arranged at the lower side.

The lower arm typically has three ends. Among the three ends, a ball joint is coupled to a first end so as to be coupled to a knuckle of a vehicle wheel, and bushings are coupled to the remaining second and third ends so as to be coupled to a vehicle body (e.g., a sub-frame).

The ball joint generally includes a first end coupled to the lower arm, and a second end corresponding to a stud part. In particular, the first end has a ball part, and the second end penetrates the knuckle and then is fastened to a nut, such that the ball joint forms a structure that connects the lower arm and the knuckle.

However, in the above-described structure in the related art, an axial force is applied in an axial direction corresponding to a longitudinal direction of the ball joint at the time of fastening the nut, and the ball joint is finely moved in the axial direction as the axial force is applied in the axial direction. The axial movement of the ball joint causes a problem in that a position of a hard point corresponding to a center of the ball joint is changed, and the change in position of the hard point causes a problem in that the geometrical characteristics of the vehicle are changed.

In addition, the axial force, which is generated at the time of fastening the nut, may cause a problem in that the stud part, which is made of a steel material and penetrates the knuckle, penetrates into the knuckle while damaging the knuckle made of an aluminum material when the ball joint moves in the axial direction. To prevent the above-mentioned problem, a component such as a pipe bushing is provided, as an insert, in a hole of the knuckle that the stud part penetrates. However, the insert component causes a problem in that the weight and costs are increased.

In addition, because of the structure in which the stud part of the ball joint penetrates the knuckle and then is fastened to the nut, there are problems in that a length of the stud part is increased to ensure a portion to be fastened to the nut, the increase in length of the stud part increases an overall length of the ball joint, which increases the weight and costs.

In addition, a washer is used to fasten the nut, and an anti-separation pin is used to prevent the separation of the nut after the nut is fastened. Because of the use of the washer and the anti-separation pin, there is also a problem in that the number of components and the costs are increased.

As another example, there is also a structure in which a stud part of a ball joint is inserted into a knuckle, and a bolt penetrates the knuckle and the stud part in a direction orthogonal to a longitudinal direction of the stud part and then is fastened to the nut, such that the ball joint is installed.

The above-mentioned structure in the related art has an advantage in that a change in position of a hard point of the ball joint is small because the bolt and the nut are fastened to the stud part in the perpendicular direction. However, because the bolt penetrates the stud part in the perpendicular direction, there is a problem in that it is necessary to ensure a sufficient peripheral space for fastening the bolt, which is disadvantageous in terms of a layout.

In addition, because the structure is fastened by using the nut, the use of the washer and the anti-separation pin is still required, which causes an increase in number of components and costs.

The foregoing explained as the background is provided merely to aid in the understanding of the background of the present disclosure, and is not intended to mean that the present disclosure falls within the purview of the related art that is already known to those having ordinary skill in the art.

SUMMARY

The present disclosure is proposed to solve these problems and aims to provide a suspension for a vehicle that has a structure in which a stud part of a ball joint is inserted into a knuckle, a bolt enters the stud part in a longitudinal direction from the opposite side and then is fastened to the stud part. In particular, the stud part is spread outward and coupled to the knuckle at the time of fastening the bolt, such that the ball joint does not move in an axial direction even though an axial force is applied in the axial direction corresponding to a longitudinal direction of the ball joint at the time of fastening the bolt, and thus a position of a hard point of the ball joint is not changed, thereby preventing a change in geometrical characteristics of a vehicle.

The present disclosure also reduces the number of components, weight, and costs by providing a configuration in which the ball joint does not move in the axial direction at the time of fastening the bolt, which may prevent the stud part made of a steel material from penetrating into the knuckle made of an aluminum material, and thus an insert component such as a pipe bushing need not be provided in the knuckle.

The present disclosure also aims to simplify a configuration and reduce the weight and costs by providing a configuration in which the bolt is inserted into and fastened to the stud part in the longitudinal direction, such that an advantageous layout is implemented because it is not necessary to separately provide a fastening space for the bolt, and a nut and a nut-related component are not used.

To achieve the above-mentioned objects, an embodiment of the present disclosure provides a suspension for a vehicle. The suspension includes: a lower arm and a knuckle disposed to be spaced apart from each other; a ball joint having one end having a ball part and coupled to the lower arm, and the other end corresponding to a stud part and installed by being inserted into the knuckle; and a bolt fastened to the stud part by penetrating the knuckle in a direction opposite to a direction in which the stud part is inserted and entering the stud part in a longitudinal direction of the stud part.

The stud part may be spread outward and expanded in outer diameter when the bolt is fastened to the stud part, and a restrictive force may be implemented as contact between the stud part and the knuckle increases when the outer diameter is expanded, such that the stud part and the knuckle are coupled.

A screw groove may be formed at a center of the stud part and extend in the longitudinal direction of the stud part, and the screw groove may be screw-fastened to a threaded portion of the bolt.

The knuckle may have a stud part insertion groove into which the stud part of the ball joint is inserted, a head part insertion groove into which a head part of the bolt is inserted and seated, and an intermediate hole configured to connect the stud part insertion groove and the head part insertion groove, and the stud part insertion groove, the head part insertion groove, and the intermediate hole may be connected on the same axis.

The stud part may be split into a plurality of stud portions by two or more cut-out grooves cut in the longitudinal direction of the stud part.

A protrusion portion may protrude inward from an inner diameter of the stud part insertion groove, the protrusion portion may be inserted into the cut-out groove when the stud part is inserted into the stud part insertion groove, and the protrusion portion inserted into the cut-out groove may prevent a rotation of the ball joint when the bolt is fastened or unfastened.

The head part insertion groove may have a tapered surface having a diameter that gradually increases toward the other side of the head part insertion groove opposite to an inner side connected to the intermediate hole, and the head part of the bolt may have a tapered shape corresponding to the tapered surface of the head part insertion groove, such that the head part insertion groove and the head part of the bolt are in surface contact with each other.

A diameter of the screw groove of the stud part may be smaller than a diameter of the threaded portion of the bolt before the bolt is fastened to the stud part, and an outer diameter of the stud part may be expanded, and the stud part may be coupled to the knuckle when the threaded portion of the bolt is inserted and fastened into the screw groove of the stud part.

Even though an axial force is applied in an axial direction to the ball joint when the bolt is fastened to the stud part in a state in which the stud part is inserted into the stud part insertion groove, a state in which the stud part is supported in the stud part insertion groove may be maintained such that the ball joint does not move in the axial direction, and a position of a hard point of the ball joint may not be changed as the ball joint does not move in the axial direction at the time of fastening the bolt.

When the ball joint and the knuckle may be completely coupled by fastening the bolt, an axial movement and radial movement of the ball joint may be restricted by a screw fastening force between the bolt and the stud part and a coupling force implemented by contact between the stud part and the knuckle, and a restriction made by the cut-out groove and the protrusion portion may prevent a circumferential rotation.

According to the suspension for a vehicle according to the present disclosure described above, even though the axial force is applied in the axial direction to the ball joint when the threaded portion of the bolt is fastened to the screw groove of the stud part in the state in which the stud part of the ball joint is inserted into the stud part insertion groove of the knuckle, the state in which the stud part is supported in the stud part insertion groove is maintained, such that the ball joint does not move in the axial direction. When the ball joint does not move in the axial direction, the position of the hard point corresponding to the center of the ball joint is not changed. Because the position of the hard point of the ball joint is not changed, the geometrical characteristics of the vehicle are not changed, such that the suspension of the vehicle may sufficiently perform the inherent function.

In addition, in the embodiment according to the present disclosure, because the ball joint does not move in the axial direction at the time of fastening the bolt, there occurs no problem that the stud part made of a steel material penetrates into the knuckle while damaging the knuckle made of an aluminum material. Therefore, it is not necessary to provide an insert component, such as a pipe bushing, in the knuckle. Therefore, it is possible to reduce the number of components, weight, and costs.

In addition, in the embodiment according to the present disclosure, because the threaded portion of the bolt is inserted and fastened into the screw groove in the longitudinal direction of the stud part, it is not necessary to separately ensure the fastening space of the bolt, which implements an advantage in terms of a layout. In particular, a nut and a nut-related component are not used, which may simplify the configuration and reduce the weight and costs.

In addition, in the embodiment according to the present disclosure, because the bolt is inserted into the stud part in the longitudinal direction and screw-fastened to the stud part, an overall length of the ball joint may be reduced, and the position of the hard point corresponding to the center of the ball joint may be close to the ground surface as the length of the ball joint is reduced, thereby configuring a geometry advantageous in terms of lateral rigidity of the vehicle.

DETAILED DESCRIPTION

Figure 1:
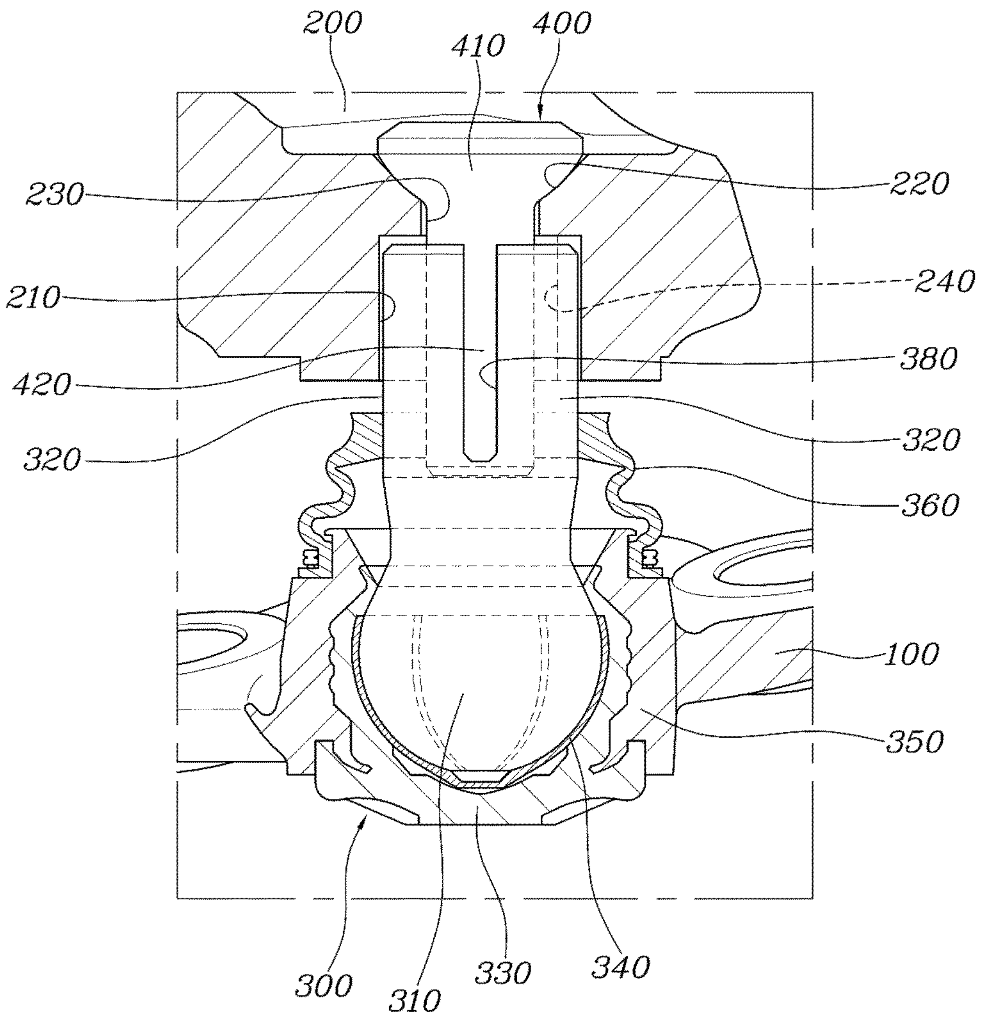
FIG. 1 is a view for explaining a state in which a ball joint for connecting a knuckle and a lower arm is coupled to the knuckle by a bolt according to an embodiment of the present disclosure.

Hereinafter, embodiments disclosed in the present specification are described in detail with reference to the accompanying drawings. The same or similar constituent elements are assigned with the same reference numerals regardless of reference numerals, and the repetitive description thereof is omitted.

The suffixes 'module', 'unit', 'part', and 'portion' used to describe constituent elements in the following description are used together or interchangeably in order to facilitate the description, but the suffixes themselves do not have distinguishable meanings or functions.

In the description of the embodiments of the present disclosure, the specific descriptions of publicly known related technologies are omitted when it is determined that the specific descriptions may obscure the subject matter of the embodiments disclosed in the present specification.

In addition, it should be understood that the accompanying drawings are provided only to allow those having ordinary skill in the art to easily understand the embodiments disclosed in the present specification, and the technical spirit disclosed in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements.

When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

In addition, the term "control unit" or "unit" including "motor control unit (MCU)" or "hybrid control unit (HCU)" is merely a term widely used to name a control device (controller or control unit) for controlling a particular vehicle function but does not mean a generic function unit.

The control unit (controller) may include a communication device configured to communicate with another control unit or a sensor to control a corresponding function, a memory configured to store an operating system, a logic command, and input/output information, and one or more processors configured to perform determination, computation, decision, or the like required to control the corresponding function.

When a component, device, element, or the like of the present disclosure is described as having a purpose or performing an operation, function, or the like, the component, device, or element should be considered herein as being "configured to" meet that purpose or to perform that operation or function.

Hereinafter, a suspension for a vehicle according to an embodiment of the present disclosure is described with reference to the accompanying drawings.

Figure 2:
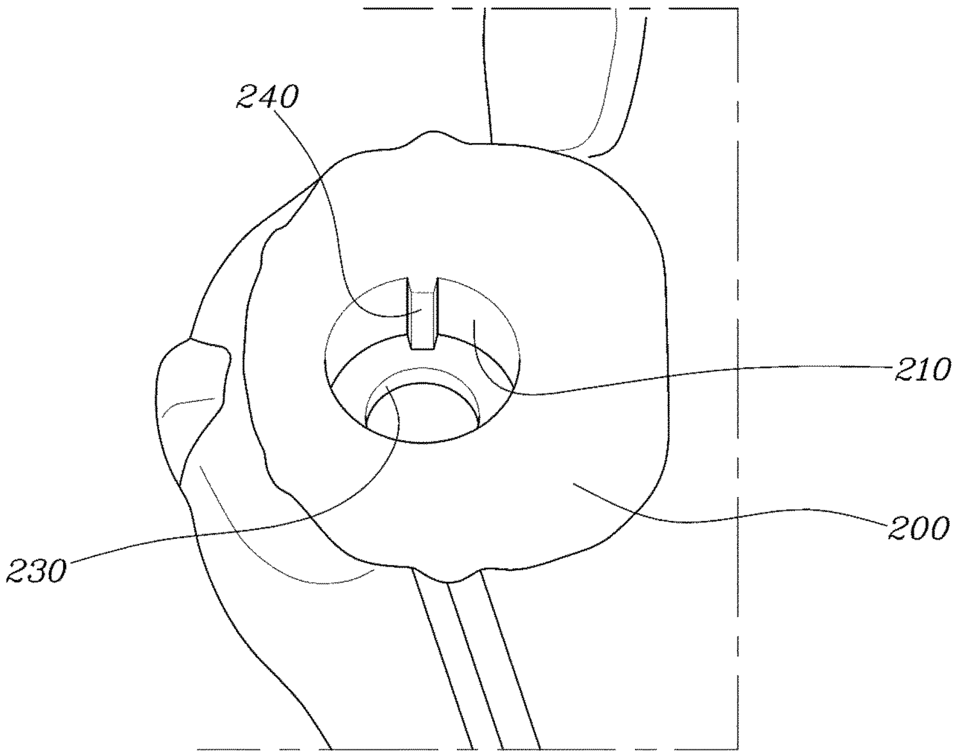
FIG. 2 is a view for explaining a protrusion portion formed on the knuckle according to an embodiment of the present disclosure.
Figure 3:
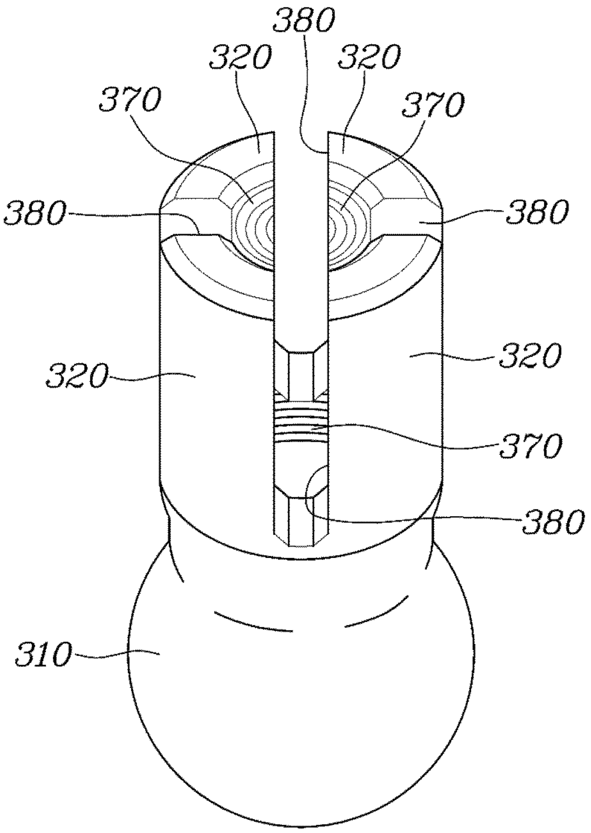
FIG. 3 is a view for explaining a state in which a stud part is split into a plurality of stud portions by cut-out grooves according to an embodiment of the present disclosure.
Figure 4:
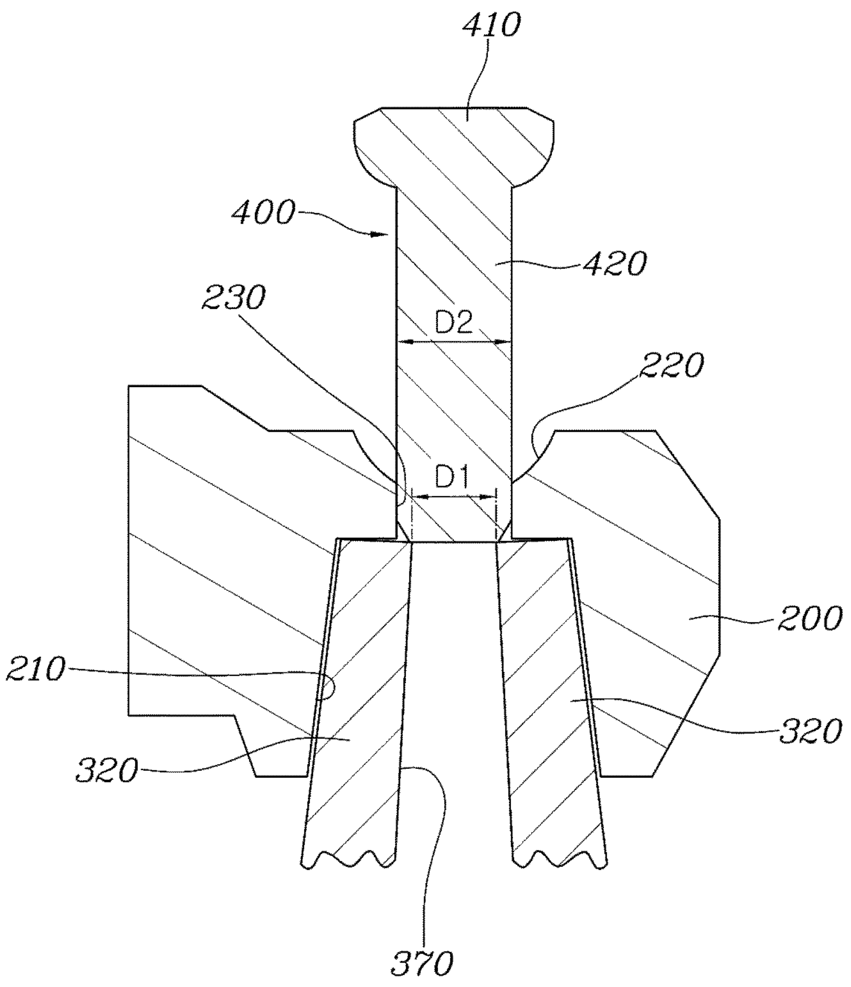
FIGS. 4 to 5 are views illustrating a state in which the bolt is not fastened to the stud part and a state in which the bolt is fastened to the stud part according to an embodiment of the present disclosure.
Figure 5:
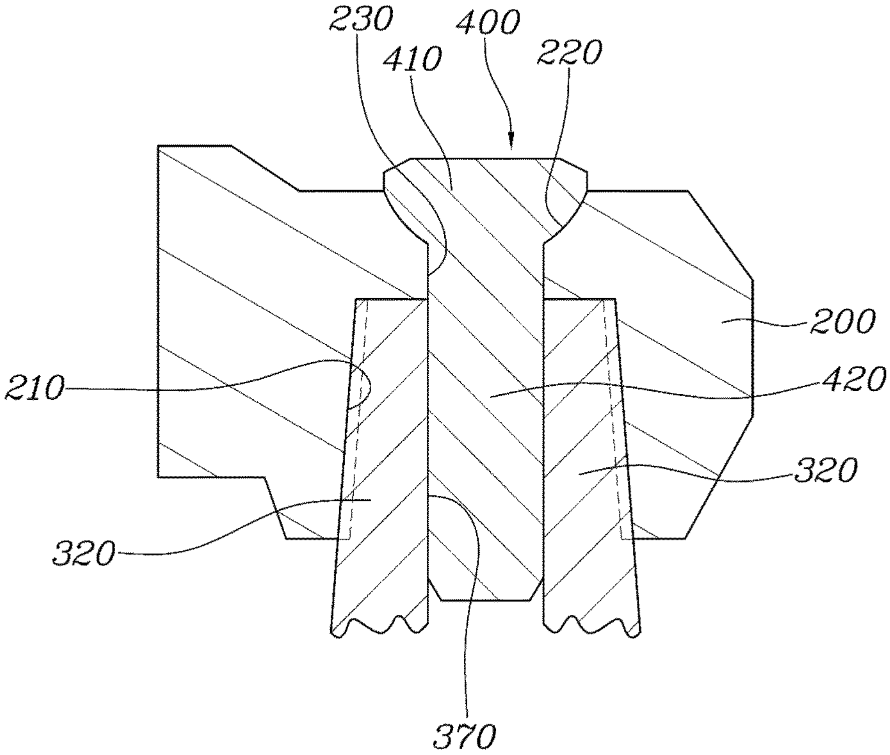

As illustrated in FIGS. 1 to 5, the suspension for a vehicle includes: a lower arm 100 corresponding to a suspension arm for controlling a motion of a wheel of the vehicle, a knuckle 200 or carrier of the vehicle wheel, a ball joint 300 installed to connect the lower arm 100 and the knuckle 200, and a bolt 400 configured to couple the knuckle 200 and the ball joint 300.

Based on the state illustrated in the drawings, the lower arm 100 is positioned below the knuckle 200, and the lower arm 100 and the knuckle 200 are disposed to be spaced apart from each other in an upward/downward direction.

The ball joint 300 is disposed to extend in an upward and downward direction corresponding to a longitudinal direction of an axis. The ball joint 300 is installed to connect the knuckle 200 and the ball joint 300 by a fastening force of the bolt 400.

The knuckle 200 has a hole formed through upper and lower surfaces of the knuckle 200. The hole is formed by a stud part insertion groove 210, a head part insertion groove 220, and an intermediate hole 230. In particular, the stud part insertion groove 210, the head part insertion groove 220, and the intermediate hole 230 are connected to each other.

The stud part insertion groove 210 is opened from a bottom surface of the knuckle 200. A stud part 320 of the ball joint 300 is inserted into the stud part insertion groove 210.

The head part insertion groove 220 is opened from a top surface of the knuckle 200. A head part 410 of the bolt 400 is inserted into the head part insertion groove 220.

The intermediate hole 230 is disposed between the stud part insertion groove 210 and the head part insertion groove 220 and connects the stud part insertion groove 210 and the head part insertion groove 220.

The stud part insertion groove 210, the head part insertion groove 220, and the intermediate hole 230 are connected straight on the same axis.

The ball joint 300 includes a ball part 310 having a spherical shape, the stud part 320 protruding from the ball part 310, a ball cap 330 configured to surround the ball part 310, a bearing 340 installed between the ball part 310 and the ball cap 330, a ball casing 350 configured to cover an outer side of the ball cap 330, and a dust cover 360 configured to seal an opened upper side of the ball casing 350.

One end (a lower end) of the ball joint 300, at which the ball part 310 is provided, is fixedly coupled to the lower arm 100, and the other end (an upper end) of the ball joint 300, which corresponds to the stud part 320, is installed to be inserted into the stud insertion groove 210 of the knuckle 200.

The bolt 400 is installed as the bolt 400 penetrates the knuckle 200 in a direction opposite to a direction in which the stud part 320 is inserted, the bolt 400 enters the stud part 320 in a longitudinal direction of the stud part 320, and the bolt 400 is screw-fastened to the stud part 320.

In other words, a threaded portion 420 of the bolt 400 penetrates the head part insertion groove 220 and the intermediate hole 230 of the knuckle 200 and then is screw-fastened to the stud part 320 of the ball joint 300 in a state where the stud part 320 is being inserted into the stud insertion groove 210.

A screw groove 370 is formed at a center of the stud part 320 of the ball joint 300 and extends in the longitudinal direction of the stud part 320. The screw groove 370 is screw-fastened to the threaded portion 420 of the bolt 400.

Two or more cut-out grooves 380 are formed in the stud part 320 of the ball joint 300 by being cut in the longitudinal direction of the stud part 320, and the stud part 320 is split into a plurality of stud portions 320 by the cut-out grooves 380.

Therefore, when the threaded portion 420 of the bolt 400 penetrates the head part insertion groove 220 and the intermediate hole 230 of the knuckle 200 and then is fastened by being inserted into the screw groove 370 of the stud part 320, the plurality of stud portions 320 separated by the cut-out grooves 380 is spread outward and expanded in outer diameter. When the outer diameter of the plurality of stud portions 320 is expanded, a contact area between the stud part 320 and the stud insertion groove 210 of the knuckle 200 increases, and a restrictive force is implemented, such that the stud part 320 of the ball joint 300 is coupled to the knuckle 200.

Further, one or more protrusion portions 240 protrude inward from an inner diameter of the stud part insertion groove 210 of the knuckle 200. The protrusion portion 240 is inserted into the cut-out groove 380 of the stud part 320 when the stud part 320 of the ball joint 300 is inserted into the stud part insertion groove 210.

Therefore, the protrusion portion 240 inserted into the cut-out groove 380 may prevent a rotation of the ball joint 300 when the bolt 400 is fastened or unfastened, thereby maintain a more robust fastening force.

The head part insertion groove 220 of the knuckle 200 has a tapered surface having a diameter that gradually increases toward the other side (upward) of the head part insertion groove 220 that is opposite to an inner side connected to the intermediate hole 230. A bottom surface of the head part 410 of the bolt 400 has a tapered shape corresponding to the tapered surface of the head part insertion groove 220, such that the head part insertion groove 220 and the head part 410 of the bolt 400 are in surface contact with each other. Therefore, a clearance between the head part insertion groove 220 and the head part 410 may be removed, which makes it possible to maintain a more robust fastening force.

The threaded portion 420 of the bolt 400 is inserted and fastened into the screw groove 370 of the stud part 320 of the ball joint 300. When the threaded portion 420 is inserted into the screw groove 370, the plurality of stud portions 320 separated by the cut-out grooves 380 is spread outward and expanded in outer diameter. When the outer diameter of the plurality of stud portions 320 is expanded, a contact area between the stud part 320 and the stud insertion groove 210 of the knuckle 200 increases, and a restrictive force is implemented, such that the stud part 320 of the ball joint 300 is coupled to the knuckle 200.

To this end, before the threaded portion 420 of the bolt 400 is fastened to the screw groove 370 of the stud part 320, a diameter D1 of the screw groove 370 of the stud part 320 may be smaller than a diameter D2 of the threaded portion 420 of the bolt 400.

According to the suspension for a vehicle according to the present disclosure described above, the axial force is applied in the axial direction to the ball joint 300 when the threaded portion 420 of the bolt 400 is fastened to the screw groove 370 of the stud part 320 in the state in which the stud part 320 of the ball joint 300 is inserted into the stud part insertion groove 210 of the knuckle 200. Even though the axial force is applied, the state in which the stud part 320 is supported in the stud part insertion groove 210 is maintained, such that the ball joint 300 does not move in the axial direction.

When the ball joint 300 does not move in the axial direction at the time of fastening the bolt 400, the position of the hard point corresponding to the center of the ball joint 300 is not changed. Because the position of the hard point of the ball joint 300 is not changed, the geometrical characteristics of the vehicle are not changed, such that the suspension of the vehicle may sufficiently perform the inherent function.

In the embodiments according to the present disclosure, because the ball joint 300 does not move in the axial direction at the time of fastening the bolt 400, the stud part 320 made of a steel material does not penetrate into the knuckle 200 made of an aluminum material. Therefore, unlike the structure in the related art, the knuckle 200 is not damaged and it is not necessary to provide an insert component, such as a pipe bushing, in the knuckle 200 to prevent a damage caused when the stud part penetrates the knuckle. Therefore, it is possible to reduce the number of components, weight, and costs.

In addition, in the embodiment according to the present disclosure, because the threaded portion 420 of the bolt 400 is inserted and fastened into the screw groove 370 in the longitudinal direction of the stud part 320, it is not necessary to separately provide the fastening space of the bolt 400, which implements an advantage in terms of a layout. In particular, unlike the structure in the related art, a nut and a nut-related component are not used, which may simplify the configuration and reduce the weight and costs.

In addition, in the embodiment according to the present disclosure, because the bolt 400 is inserted into the stud part 320 in the longitudinal direction and screw-fastened to the stud part 320, an overall length of the ball joint 300 may be reduced, and the position of the hard point corresponding to the center of the ball joint 300 may be close to the ground surface as the length of the ball joint 300 is reduced, thereby configuring a geometry advantageous in terms of lateral rigidity of the vehicle.

In the embodiment according to the present disclosure, when the ball joint 300 and the knuckle 200 are completely coupled by fastening the bolt 400, the axial movement and radial movement of the ball joint 300 are restricted by a screw fastening force between the bolt 400 and the stud part 320 and a coupling force implemented by contact between the stud part 320 and the knuckle 200, and the restriction made by the cut-out grooves 380 and the protrusion portion 240 prevents the circumferential rotation, which makes it possible to maintain a more robust coupled state.

While the specific embodiments of the present disclosure have been illustrated and described, it should be obvious to those having ordinary skill in the art that the present disclosure may be variously modified and changed without departing from the technical spirit of the present disclosure.

What is claimed is:

1. A suspension for a vehicle, the suspension comprising:
- a lower arm and a knuckle disposed to be spaced apart from each other;
- a ball joint including: a first end having a ball part and coupled to the lower arm, and a second end corresponding to a stud part and installed by being inserted into the knuckle; and
- a bolt fastened to the stud part by penetrating the knuckle in a direction opposite to a direction in which the stud part is inserted, the bolt configured to enter the stud part in a longitudinal direction of the stud part,
- wherein the stud part is spread outward and expanded in outer diameter when the bolt is fastened to the stud part, and
- wherein a restrictive force is implemented as a contact between the stud part and the knuckle increases when the outer diameter is expanded, such that the stud part and the knuckle are coupled.

2. The suspension of claim 1, wherein a screw groove is formed at a center of the stud part and extends in the longitudinal direction of the stud part, and the screw groove is screw-fastened to a threaded portion of the bolt.

3. The suspension of claim 2, wherein a diameter of the screw groove of the stud part is smaller than a diameter of the threaded portion of the bolt before the bolt is fastened to the stud part, and wherein an outer diameter of the stud part is expanded, and the stud part is coupled to the knuckle when the threaded portion of the bolt is inserted and fastened into the screw groove of the stud part.

4. The suspension of claim 1, wherein the knuckle includes:

a stud part insertion groove into which the stud part of the ball joint is inserted, a head part insertion groove into which a head part of the bolt is inserted and seated, and an intermediate hole configured to connect the stud part insertion groove and the head part insertion groove, and wherein the stud part insertion groove, the head part insertion groove, and the intermediate hole are connected to each other on a same axis.

5. The suspension of claim 4, wherein the stud part is split into a plurality of stud portions by two or more cut-out grooves cut in the longitudinal direction of the stud part.

6. The suspension of claim 5, wherein a protrusion portion protrudes inward from an inner diameter of the stud part insertion groove, wherein the protrusion portion is inserted into the cut-out groove when the stud part is inserted into the stud part insertion groove, and wherein the protrusion portion inserted into the cut-out groove prevents a rotation of the ball joint when the bolt is fastened or unfastened.

7. The suspension of claim 6, wherein when the ball joint and the knuckle are completely coupled by fastening the bolt, an axial movement and radial movement of the ball joint are restricted by a screw fastening force between the bolt and the stud part and a coupling force implemented by contact between the stud part and the knuckle, and a restriction made by the cut- out groove and the protrusion portion prevents a circumferential rotation.

8. The suspension of claim 5, wherein the head part insertion groove has a tapered surface having a diameter that gradually increases toward the other side of the head part insertion groove opposite to an inner side connected to the intermediate hole, and wherein the head part of the bolt has a tapered shape corresponding to the tapered surface of the head part insertion groove, such that the head part insertion groove and the head part of the bolt are in surface contact with each other.

9. The suspension of claim 4, wherein even though an axial force is applied in an axial direction to the ball joint when the bolt is fastened to the stud part in a state in which the stud part is inserted into the stud part insertion groove, a state in which the stud part is supported in the stud part insertion groove is maintained such that the ball joint does not move in the axial direction, and wherein a position of a hard point of the ball joint is not changed as the ball joint does not move in the axial direction at a time of fastening the bolt.

10. A suspension for a vehicle, the suspension comprising:

a lower arm and a knuckle disposed to be spaced apart from each other;

a ball joint including: a first end having a ball part and coupled to the lower arm, and a second end corresponding to a stud part and installed by being inserted into the knuckle; and a bolt fastened to the stud part by penetrating the knuckle in a direction opposite to a direction in which the stud part is inserted, the bolt configured to enter the stud part in a longitudinal direction of the stud part, wherein a screw groove is formed at a center of the stud part and extends in the longitudinal direction of the stud part, and the screw groove is screw-fastened to a threaded portion of the bolt, wherein a diameter of the screw groove of the stud part is smaller than a diameter of the threaded portion of the bolt before the bolt is fastened to the stud part, and wherein an outer diameter of the stud part is expanded, and the stud part is coupled to the knuckle when the threaded portion of the bolt is inserted and fastened into the screw groove of the stud part.

11. A suspension for a vehicle, the suspension comprising:

a lower arm and a knuckle disposed to be spaced apart from each other;

a ball joint including: a first end having a ball part and coupled to the lower arm, and a second end corresponding to a stud part and installed by being inserted into the knuckle; and a bolt fastened to the stud part by penetrating the knuckle in a direction opposite to a direction in which the stud part is inserted, the bolt configured to enter the stud part in a longitudinal direction of the stud part, wherein the knuckle includes:

a stud part insertion groove into which the stud part of the ball joint is inserted, a head part insertion groove into which a head part of the bolt is inserted and seated, and an intermediate hole configured to connect the stud part insertion groove and the head part insertion groove, wherein the stud part insertion groove, the head part insertion groove, and the intermediate hole are connected to each other on a same axis, wherein even though an axial force is applied in an axial direction to the ball joint when the bolt is fastened to the stud part in a state in which the stud part is inserted into the stud part insertion groove, a state in which the stud part is supported in the stud part insertion groove is maintained such that the ball joint does not move in the axial direction, and wherein a position of a hard point of the ball joint is not changed as the ball joint does not move in the axial direction at a time of fastening the bolt.

* * * * *